United States Patent [19]
Inwood et al.

[11] Patent Number: 5,578,983
[45] Date of Patent: Nov. 26, 1996

[54] SCHOOL BUS SAFETY DEVICE AND METHOD OF USE

[76] Inventors: Robin R. C. Inwood, 25 Shady Lane, St. Thomas, Ontario, Canada, N5P 3T2; John L. Norman, 110 Dear Valley Crescent, London, Ontario, Canada, N6J 4H5; Frank Da Costa, 1483 Jalna Boulevard, London, Ontario, Canada, N6E 2G4

[21] Appl. No.: 177,157

[22] Filed: Jan. 4, 1994

[51] Int. Cl.$^6$ ...................................... B60Q 1/00
[52] U.S. Cl. ...................... 340/438 B; 340/433
[58] Field of Search .................. 340/433, 438, 340/463, 464, 468, 470, 471, 472, 473, 944, 907, 908, 332

[56] References Cited

U.S. PATENT DOCUMENTS

| | | | |
|---|---|---|---|
| 2,384,689 | 9/1945 | Moore | 340/470 |
| 2,400,655 | 5/1946 | Saia | 177/329 |
| 2,485,719 | 10/1949 | Edwards | 340/468 |
| 2,503,336 | 4/1950 | Hines | 340/470 |
| 2,603,700 | 7/1952 | Martin | 340/433 |
| 2,651,028 | 9/1953 | Dupree | 340/468 |
| 2,673,307 | 3/1954 | Weishuhn | 340/470 |
| 2,673,974 | 3/1954 | Beauchemin | 340/433 |
| 2,851,674 | 9/1958 | Boone | 340/470 |
| 3,444,513 | 5/1969 | Kratochvil | 340/433 |
| 3,491,336 | 1/1970 | Anderson | 340/84 |
| 3,786,498 | 1/1974 | Lipe | 340/371 |
| 3,838,392 | 9/1974 | Lockwood | 340/75 |
| 3,873,968 | 3/1975 | Baader | 340/433 |
| 3,902,159 | 8/1975 | Parolin | 340/433 |
| 4,117,454 | 9/1978 | Fabry et al. | 340/433 |
| 4,426,638 | 1/1984 | Donley et al. | 340/433 |
| 4,559,517 | 12/1985 | Rahn | 340/433 |
| 4,559,518 | 12/1985 | Latta | 340/433 |
| 4,621,253 | 11/1986 | Pillinger et al. | 340/472 |
| 4,713,732 | 12/1987 | Schamblin | 340/472 |
| 5,175,528 | 12/1992 | Choi et al. | 340/473 |
| 5,199,754 | 4/1993 | Freeman | 293/117 |
| 5,253,115 | 10/1993 | Ueno | 340/464 |
| 5,281,948 | 1/1994 | Estrada | 340/433 |
| 5,281,949 | 1/1994 | Donley et al. | 340/433 |
| 5,293,151 | 3/1994 | Rose | 340/433 |

*Primary Examiner*—Jeffery Hofsass
*Assistant Examiner*—Nina Tong
*Attorney, Agent, or Firm*—Fish & Neave

[57] ABSTRACT

A safety device for mounting on school buses is provided. The device includes light assemblies so as to be visible in their on and flashing modes only within certain horizontal arcs which describe certain areas parallel to and in front of school buses. School children exiting the school bus are directed by the initial light to proceed to a first position located on the side of the road, in sight of the school bus driver and where a first light is visible. The school children are then directed by the first light to move to a second position in which a second light is visible. The second position is immediately in front of the school bus, and in sight of the driver. The driver then indicates to the children, via the second light source, to proceed with crossing the roadway only after the driver has ascertained that it is safe to do so.

28 Claims, 4 Drawing Sheets

Angle of View = 2 >:ArcTan(Aperature Width/Aperature Depth)

SCHOOL BUS SAFETY DEVICE AND METHOD OF USE

FIELD OF INVENTION

This invention relates generally to a safety device for motor vehicles and to a method of using the safety device to ensure that passengers exit the motor vehicle safely. In particular, the present invention relates to a safety device for mounting on a school bus and to a method of ensuring that school children exiting from the school bus can safely cross the roadway.

BACKGROUND OF INVENTION

School buses are extensively used throughout North America for transporting school children to and from schools. Currently, there are almost 700,000 school buses in use in Canada and the United States. Although the safety records of school buses have improved substantially recently, there still occur, unfortunately, accidents wherein the school children are injured, and sometimes killed, after exiting a school bus.

A substantial problem with school buses is that drivers have difficulty in seeing young children crossing immediately in front of the bus. That is, many children cross the road by walking immediately in front of the school bus. This poses a very serious problem because the relative sizes of the children and the buses are such that the drivers will sometimes not see the children as they cross in front of the bus. Thus, a child immediately in front of the bus is typically out in the blind spot of the driver. The driver, thinking that he can proceed, may hit and injure the child. Moreover, school bus drivers are expected to communicate with the exited passengers by means of hand signals. Under certain road and ambient light conditions, this method of communication is less than satisfactory.

In addition, children exiting a school bus and wanting to cross the roadway face the hazard of being struck by a motor vehicle travelling on the road. Regulations in most areas of Canada and the United States require school buses to activate flashing red lights and a swing-out stop sign when the bus is stopped to warn motorists that children are exiting the bus. When the flashing red lights and stop sign are activated, motorists travelling in both directions on the road are required to stop and remain stopped until the flashing lights and stop sign are de-activated.

Numerous attempts have been made to overcome these problems in the prior art. For example, U.S. Pat. No. 4,559,517 discloses a warning system mounted on the front of a school bus. The system provides two signals to school children who are off the bus: the first signal is a flashing red light and the second is a steady green light. The warning system is controlled by the driver and allows the driver to direct the children safely across the roadway. The system has two opposed pairs of transparent areas, one being red and the other one being green. The opposite face of the unit has the identical construction. Therefore, when the flashing red light is turned on, it can be seen from both sides of the device, and therefore from both sides of the road. Similarly, when the green light is turned on, it can also be seen from both sides of the road.

The warning system device disclosed in U.S. Pat. No. 4,559,517 allows the driver to indicate to children who want to cross the road when it is safe to do so. If the driver sees that there may be a potential traffic hazard with respect to crossing the road, for example, an approaching motorist who does not appear to be stopping, the driver switches on the flashing red lights to alert the children on both sides of the road not to cross the road. When the driver observes that all is clear, he can then switch the green lights on to advise the children that they may now cross the road. Since each of the flashing red lights or the steady green lights can be seen from both sides of the device, children standing on either side of the road can be warned by the driver whether to cross or not to cross the street.

Although the device of U.S. Pat. No. 4,559,517 is useful in ensuring that children do not cross the road when a potential traffic hazard exists, the device does not address the problem of small children crossing immediately in front of the school bus and within the drivers blind spot nor does it address the potential confusing green light which may be seen by stationary and oncoming other road users.

U.S. Pat. No. 5,119,754 discloses a barrier system located on the lower front of the school bus. The barrier system includes an elongate arm which is normally stowed transversely at the front end of the bus. When the bus comes to a stop, the arm is automatically swung 90° to a position forward of the bus to provide a barrier immediately in front of the bus. The arm is operated as soon as the driver opens the doors of the bus, thus preventing children from walking immediately in front of the bus, and allowing the children to remain within sight of the driver at all times.

One of the potential disadvantages of the barrier system of U.S. Pat. No. 5,199,754 is that children become curious of the arm, and therefore have tended to play with or around the arm or to "duck under" the arm. Another potential problem is that, in colder climates, the hydraulic system, or other means of mechanical extension and withdrawal, of the barrier system tends to break down or require excessive maintenance, and difficulties in operation may be encountered in areas where heavy snow falls occur.

Another warning system for use on school buses is disclosed in U.S. Pat. No. 3,838,392. After children have disembarked from the school bus, and the doors begin to close, an audible warning signal is activated to warn the children that the bus is about to leave. The audible signal remains activated until the bus has left, and therefore children are warned to stay away from the school bus when it is about to leave.

Other visual warning systems for use with motor vehicles in general are disclosed in U.S. Pat. Nos. 2,400,655; 3,491,336; and 3,786,498.

None of the devices disclosed in the above prior art, however, address the problem of ensuring that school children disembarking a school bus and crossing the road do so in a safe manner, while remaining at all times within the field of vision of the driver.

SUMMARY OF THE INVENTION

In accordance with one aspect of the present invention, there is provided a safety device for mounting on a vehicle and allowing a driver of a vehicle to direct the movement of passengers exiting the vehicle and crossing from a first side of a road to a second side of the road after the vehicle has come to a stop adjacent to the first side. The safety device includes first means for indicating to the passengers a first position located on the first side of the road, ahead of the vehicle and in sight of the driver; second means for directing the passengers to move from the first position to a second position located in the road immediately in front of the vehicle and in sight of the driver; third means for indicating to the passengers the second position; and fourth means for directing the passengers to move from the second position to the second side of the road, thereby crossing the road.

In accordance with a second aspect of the present invention, a method is provided for ensuring that passengers exiting from a vehicle can safely cross from a first side of a road to a second side of the road after the vehicle has come to a stop adjacent the first side of the road. The method includes the steps of: indicating to the passengers a first position located on the first side of the road, ahead of the vehicle and in sight of a driver of the vehicle, and a second position located in the road immediately in front of the vehicle and in sight of the driver; directing the passengers to move from the first position to the second position; and directing the passengers to move from the second position to the second side of the road thereby crossing the road.

BRIEF DESCRIPTION OF THE DRAWINGS

The present invention will be described in greater detail with reference to the accompanying drawings, in which like numerals denote like parts in the several views, and in which.

DETAILED DESCRIPTION OF THE PREFERRED EMBODIMENT

Figure 1:
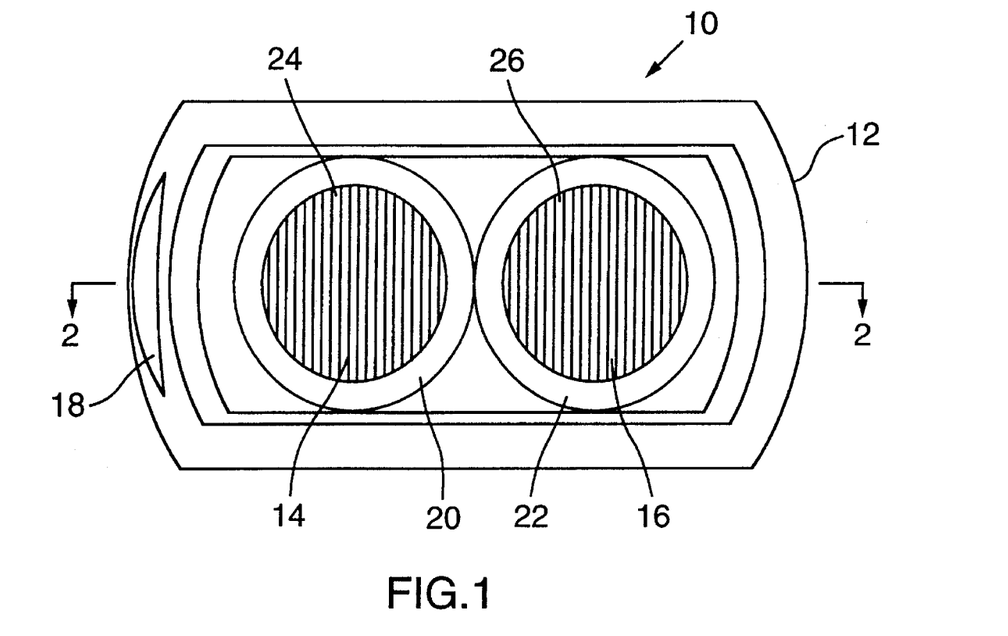
FIG. 1 is a front view of the device of the present invention.

Referring to FIG. 1, the safety device of the present invention is generally denoted with the reference numeral 10. The device 10 includes an outer casing 12 made of any suitable material such as a plastic polymer. Preferably, the outer casing 12 is made of a weather resistant material.

The device 10 is essentially a self-contained, electronic, three-way light fixture intended to be mounted permanently on the off-side, front-facing area of a school bus, as will be described below. The device 10 is powered directly from the school bus's electrical system.

The device 10 includes two light assemblies, and in a preferred embodiment, three light assemblies. A first light assembly 14 and a second light assembly 16 are similar in shape and construction. A third light assembly 18, which is present in the preferred embodiment, is provided on the left side of the device 10. The third light assembly 18, in the preferred embodiment, is the initial light that will be seen by passengers or children exiting the school bus.

Each of the first and second light assemblies 14, 16 include a grille holder 20 and 22, respectively. As well, each of the first and second light assemblies 14, 16 include a grille assembly 24 and 26, respectively. The grille assemblies 24, 26 will be described in more detail below with reference to FIGS. 5 and 6.

Figure 2:
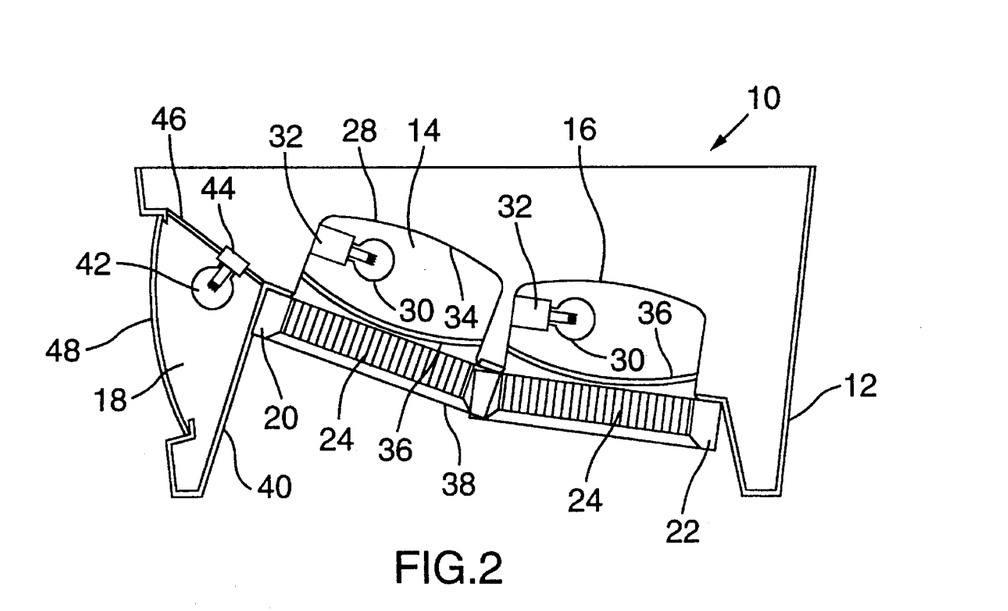
FIG. 2 is a cross-sectional view taken along line 2—2 of FIG. 1 with the outer covering not shown for clarity.

A cross-sectional view of the device 10 is shown in FIG. 2. The only difference between the light assemblies 14, 16 is their relative positioning angle within the device 10. The construction of first and second light assemblies 14, 16 will be described with reference to first light assembly 14 only, however, it will be understood that the same description applies to second light assembly 16.

First light assembly 14 includes a light housing 28 in which is disposed a light source 30, preferably an electric light bulb. A suitable light bulb socket 32 and electrical connections (not shown) are included.

The interior surface 34 of housing 28 is covered with a reflective material to reflect the light emitted by light source 30 outwardly of housing 28.

First light assembly 14 further includes a transparent lens 36, which is useful for constraining the light emitted from light source 30 so that it is constrained within a particular angle, as will be described in more detail below. The light assembly 14 further includes a grille assembly 24. As shown in FIG. 1, grille assembly 24 comprises a plurality of vertically oriented, parallel, spaced-apart disposed members mounted on a flange 38. Finally, a transparent outer covering (not shown for clarity) is provided in front of both first and second light assemblies 14 and 16 for protecting the light assemblies 14, 16.

As shown in FIG. 2, the outer casing 12 of device 10 is shaped so that the first and second light assemblies 14, 16 are recessed into the casing 12. The casing 12, includes a wall 40 between first light assembly 14 and the third light assembly 18. In the preferred embodiment, wall 40 serves an important purpose. Wall 40 assists in directing and constraining the light emitted from light assembly 14. The importance of this will become apparent below. In other words wall 40 prevents passengers, who have exited the school bus, from seeing the light emitted from light assembly 14 unless they have walked sufficiently ahead of the school bus.

As shown in FIG. 2, the third light assembly 18 is disposed on the left side of device 10. Third light assembly 18 is the initial light from device 10 that is seen by passengers exiting the school bus.

Third light assembly 18 comprises a light source 42, light socket 44 and suitable electrical connections (not shown). The housing of third light assembly 18 is formed from the wall 40 and housing portion 46. Third light assembly 18 further comprises a transparent lens assembly 48 which allows the light emitted from light source 42 to pass through the lens assembly 48. In a preferred embodiment of the present invention, lenses 36 and 48 are red so that the light emitted from the respective light assemblies is red light.

Safety device 10 is intended for mounting on the front of a school bus. The means for mounting the device on the school bus are not shown in FIG. 2, but it will be understood that they may include any suitable mounting means, such as screws, nuts and bolts, mounting brackets, flanges, etc.

Figure 3:
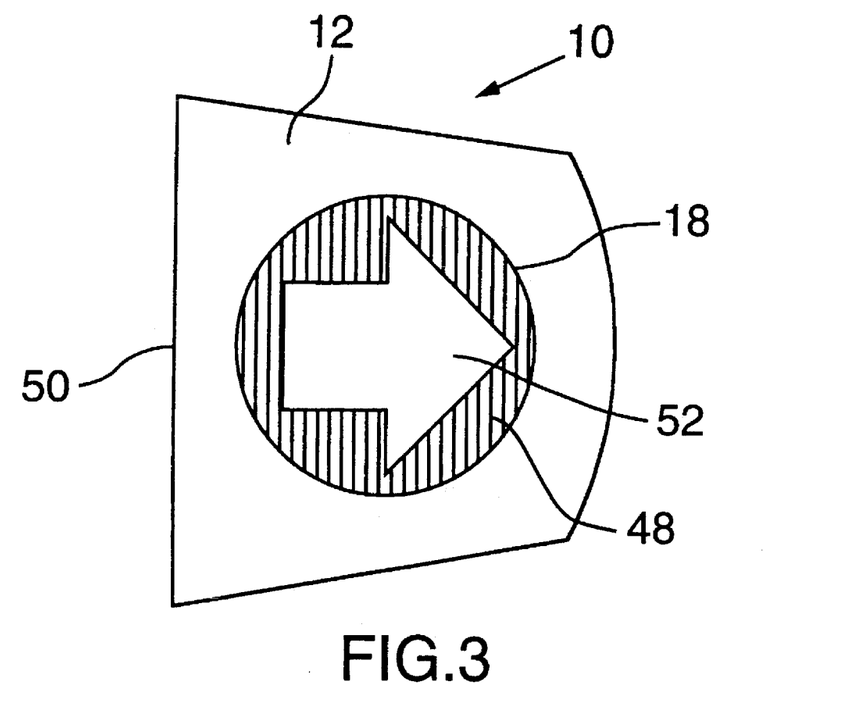
FIG. 3 is a view of the left side of the device of FIG. 1.

The left side of device 10 is shown in FIG. 3. The outer casing 12 includes a back wall 50 that rests against the front of the school bus when device 10 is mounted thereon. Third light assembly 18 is visible from the left side of device 10 and the light emitted by third light assembly 18 is the initial light from device 10 seen by passengers as they exit the school bus.

The lens assembly 48 on third light assembly 18 has, in a preferred embodiment, an arrow 52 defined on the surface of lens 48. Lenses such as lens 48 are well known and readily available. The arrow 52 is clearly visible when light is emitted through the lens 48. Arrow 52 serves the function of directing passengers who have just exited the school bus to move in the direction of arrow 52. That direction corresponds to moving ahead the front of the school bus.

Figure 4:
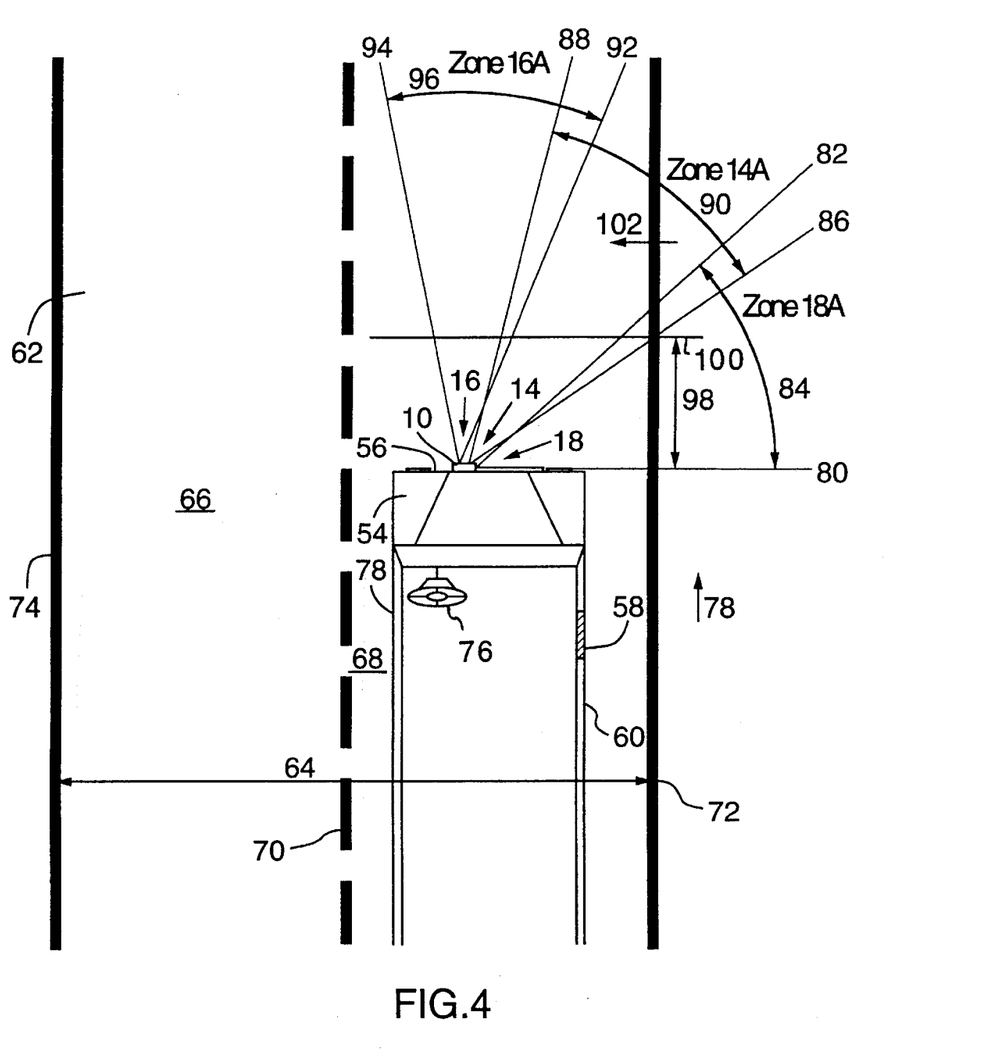
FIG. 4 is a schematic diagram of the device of FIG. 1 mounted on a school bus, showing the relative locations indicated by the device of the present invention.

With reference to FIG. 4, a schematic diagram is provided showing the device 10 mounted on the front of a school bus 54. School bus 54 includes a front end 56 on which device 10 is mounted and 54 further includes a door 58 located on the right side 60 of school bus 54.

FIG. 4 further illustrates a roadway 62, the width of which is indicated by arrow 64. As shown in FIG. 4, roadway 62 is divided into a left lane 66 and a right lane 68 by centre lines 70. Roadway 62 has a first right side 72 and a second left side 74. In North America, motor vehicles proceed forwardly in the right lane 68. As such, the positioning of door 58 on the right side of school bus 54 allows passengers to exit school bus 54 onto the right side 72 of roadway 62.

Regulations in most areas of Canada and the United States require that, when school bus 54 comes to a stop in roadway 62 and children are to exit from the school bus 54, all motor vehicles travelling on the roadway 62 are required to stop as well. As soon as school bus 54 is stopped on the side of the roadway 62, driver 76 typically will warn other motorists that children will be exiting from the bus 54 in a number of ways. Firstly, school bus 54 will be equipped with a system of warning lights mounted at the front and rear of the bus. The lights are turned on and will, usually, be flashing to warn motorists that the school bus is preparing to allow children to exit the bus. As well, school bus 54 may be equipped with a swing out arm (not shown) on side 78 which will also warn motorists that they must stop. These regulations are intended to ensure that children exiting the school bus and crossing roadway 62 do so in a safe manner by ensuring that all motor vehicles travelling on roadway 62 are stopped.

Unfortunately, as mentioned above, these regulations still do not prevent accidents from occurring and school children from being injured while exiting school buses. With the device of the present invention, children who exit school bus 54 and to cross roadway 62 will do so in a safe manner as described below. When school bus 54 stops on the side of roadway 62 and doors 58 are opened, the first, second and third lights 14, 16 and 18 are automatically turned on by suitable electrical connections (not shown). The third light assembly 18 is the initial light visible to the children as they proceed forwardly in the direction of arrow 78 after they have exited school bus 54. The initial light 18 will become visible to the children as soon as they cross a point 80 corresponding to the front 56 of school bus 54.

Initial light 18 includes a lens assembly 48, and as shown in FIG. 4, lens assembly 48 allows the light emitted from light assembly 18 to be constrained within the area bounded by line 80 and line 82. This area is referred to as Zone 18A in FIG. 4. Thus, light emitted from light assembly 18 is constrained within angle 84 as defined by lines 80 and 82, so that the light can only be seen by a person in Zone 18A. In a preferred embodiment, angle 84 is such that line 82 intersects right side 72 at a point beyond line 100, preferably such point is about 10 to 15 feet in front of the front end 56 of school bus 54. In a most preferred embodiment as shown in FIG. 4, angle 84 is about 45°.

Therefore, as children proceed in the direction of arrow 78, initial light 18 will be visible to the children from the moment they cross line 80 until they proceed beyond line 82. Since lens 48 on light assembly 18, in a preferred embodiment, includes arrow 52 which points in the same direction as arrow 78, the children are directed by the light assembly 18 to proceed in that direction.

As shown in FIG. 4, the light emitted from first light assembly 14 is visible within the area bounded by line 86 and line 88, which is referred to as Zone 14A. Therefore the light emitted from first light assembly 14 is visible only when persons are within Zone 14A. Lines 86 and 88 define an angle 90, which in the most preferred embodiment shown in FIG. 4 is about 40°. Therefore, children on roadside 72 proceeding in the direction of arrow 78 will be able to see the light emitted from first light assembly 14 as soon as they cross beyond line 86.

Similarly, the light emitted from second light assembly 16 is visible only in Zone 16A defined by lines 92 and 94. The angle 96 defined by lines 92 and 94 is in the most preferred embodiment of FIG. 4 about 33°.

A significant problem with children exiting school buses and crossing the roadway 62 in front of a school bus 54 is that the school children may not be visible to the driver 76. There is a minimum area, indicated by arrows 98 immediately in front of school bus 54 in which children should not attempt to cross the roadway 62 as they are out of driver 76's field of vision. Thus, children should proceed in the direction of arrow 78 until they are beyond line 100 to ensure that, when they cross in front of bus 54, they will remain visible to driver 76.

In order to accomplish this, it will be noted that children proceeding in the direction of arrow 78 must first proceed beyond line 100 before the light from first light assembly 14 becomes visible, in other words, before they are within Zone 14A. The importance of this will be emphasized below.

The method of use of device 10 of the present invention will now be described. In essence, the method of the present invention allows children to exit a school bus and cross the roadway in a safe manner by means of a driver-controlled sequence of sectored red lights aimed in such a way as to be visible within preset arcs which describe safety positions. In addition, the use of red lights is consistent with the overall safety signalling used to indicate danger and warning. In accordance to a further embodiment of the invention, coloured lens other than red may be substituted therefor.

As the school bus 54 stops adjacent right side 72 of roadway 62, the other safety features of school bus 54 will be activated by driver 76. For example, the swingout arm (not shown) and flashing red light systems will be activated. Driver 76 will then open doors 58 to allow children to exit the school bus 54. When the doors 58 are opened, the device 10 is automatically activated such that the light sources in light assemblies 14, 16 and 18 are turned on. First and second light assemblies 14 and 16 will be turned on to their steady on mode, that is, the lights remain on. On the other hand, the initial light assembly 18 will be turned on to its flashing on mode, that is, the light 18 flashes on and off at regular intervals.

Those children who must cross roadway 62 are taught to always cross roadway 62 in front of school bus 54 so that they will remain visible to driver 76. As these children proceed in direction of arrow 78, they will enter Zone 18A so that the initial light 18 becomes visible to them. Initial light 18 is in its flashing on mode and, in the preferred embodiment, its lens 48 includes arrow 52. The children are directed by the flashing initial light 18 to continue to proceed in the direction of arrow 78. As the children continue to do so, they will, firstly, cross line 100 so they are beyond the minimum area 98 which will allow them to remain visible to the driver 76. At the point of line 100, the children are in Zone 18A, thereby flashing initial light 18 remains visible to them. They are thus directed to continue to walk in the direction of arrow 78.

The children will then cross the point defined by line 86, thus entering Zone 14A. It will be noted that Zones 14A and 18A overlap in the area bounded by lines 82 and 86. In that overlap area, initial light 18 and first light 14 are both visible to the school children.

The children may, once they enter Zone 14A, stop, or they may continue to proceed beyond a point defined by line 82 so that only first light 14 is visible to them. The area on the right side 72 of roadway 62 beyond line 86 is the first position. Since light 14 is steady on, the children are directed to collect within the first position. Thus, the children are off the roadway 62, in sight of driver 76 and in a position to see first light source 14.

When driver 76 sees the children in that first position, he can then switch, using switch means suitably connected to device 10, first light 14 to its flashing on mode. In other words, the operating mode of first light 14, which was in its steady on mode, is switched by driver 76 so that it flashes in regular intervals between on and off. The children gathered in the first position, will see that first light 14 has now been switched to the flashing on mode. This directs the children to proceed in the direction of arrow 102 from the first position.

As can be seen from FIG. 4, children proceeding in the direction of arrow 102 from the first position will enter roadway 62 in front of school bus 54. During this time, the children remain within sight of driver 76 since they are beyond the minimum area 98.

The children continue to proceed in the direction of arrow 102 until they reach a point defined by line 92. At that point, first light 14 remains visible to the children, and second light 16 now also becomes visible to the children. In the area bounded by lines 88 and 92, Zone 14A overlaps with Zone 16A, thereby both the first light 14 and second light 16 are visible.

When the children enter Zone 16A, second light 16 is in its steady on mode. This indicates to the children that they are to stop proceeding in the direction of arrow 102 and wait in that second position. Thus, the second position in which the children are to wait is located within the right lane 68 of roadway 62, immediately in front of the school bus 54. In that second position, the children, being immediately in front of school bus 54, are shielded from any motor vehicles travelling on roadway 62 that may not have stopped as required.

With the children in the second position, driver 76 ensures that all other motor vehicles travelling on roadway 62 have come to a complete stop. Once driver 76 has ascertained that any hazard from travelling motor vehicles on roadway 62 is eliminated, driver 76 can then indicate to the children that they may proceed with crossing roadway 62 from the second position. Driver 76 does this by switching second light 16 to its flashing on mode. This indicates to the children that they may now proceed in the direction of arrow 102 to cross roadway 62 until they are on the left side 74. The children can so cross roadway 62 in a safe and prudent manner since driver 76 has ascertained that all motor vehicles travelling on roadway 62 are stopped.

Since all children are, at all times, within sight of driver 76, that is, none of the children cross within the minimum area 98, driver 76 can ensure that the children have in fact safely crossed roadway 62. Once driver 76 is sure that this has occurred, then driver 76, using the switch means connected to device 10, can then switch the entire device 10 off. Each of the first, second and third lights 14, 16, and 18 are switched to their off position. Driver 76 can then close doors 58, which cuts electrical power to device 10, and proceed on his way while the children, who have now crossed roadway 62, are safely on the left side 74.

As can be seen from FIG. 4, one of the features of the safety device 10 of the present invention is that first and third lights 14, 18 are not visible to any motorists travelling on roadway 62 in the direction towards school bus 54. Only second light 16 may, to a small extent, be visible to the motorists travelling towards school bus 54.

Table I below sets out the sequential operation of the lights of device 10.

TABLE I

| Operational Modes of Lights at Various Times | | | |
|---|---|---|---|
| STEP OR ACTION TAKEN | INITIAL LIGHT (18) | FIRST LIGHT (14) | SECOND LIGHT (16) |
| DOORS CLOSED | OFF | OFF | OFF |
| DOORS OPENED | FLASHING | STEADY ON | STEADY ON |
| CHILDREN AT FIRST POSITION | STEADY ON | STEADY ON | STEADY ON |
| PROCEED TO SECOND POSITION | STEADY ON | FLASHING | STEADY ON |
| CHILDREN AT SECOND POSITION | STEADY ON | STEADY ON | STEADY ON |
| PROCEED TO CROSS ROADWAY | STEADY ON | STEADY ON | FLASHING |

Figure 5:
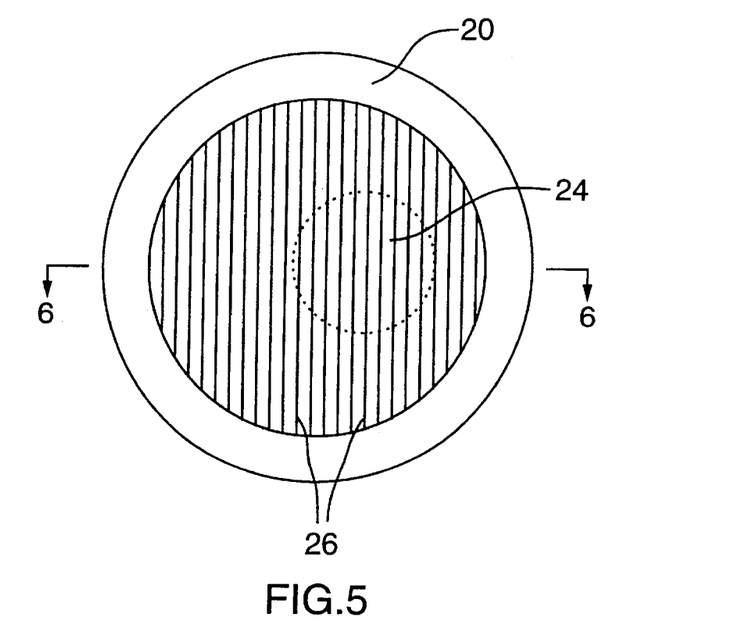
FIG. 5 is a front view of one of the light assemblies of the device of the present invention.
Figure 6:
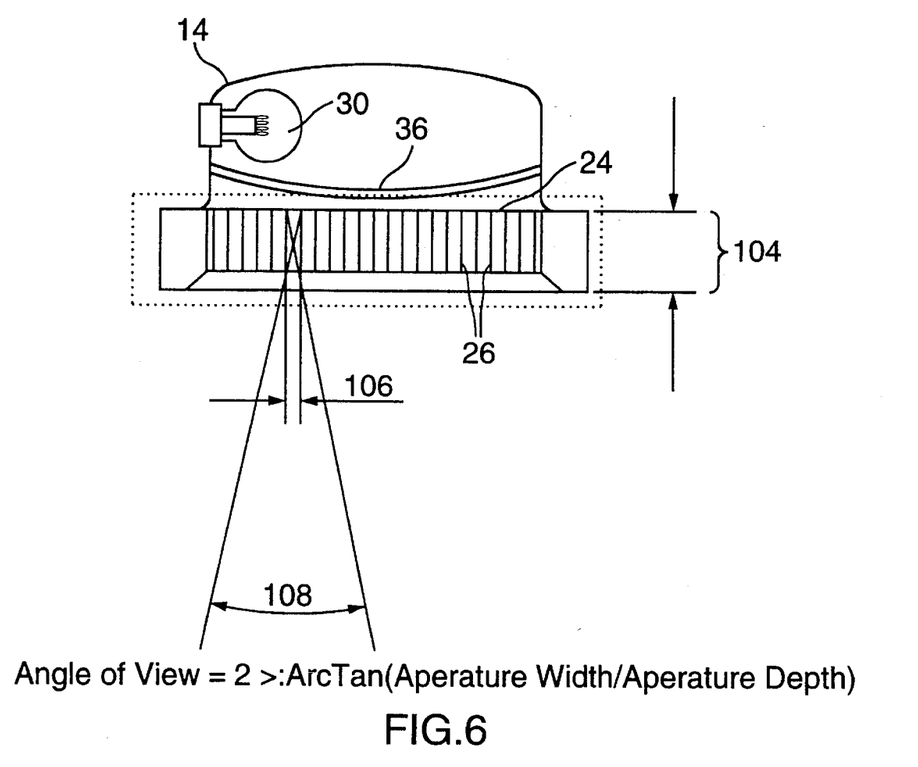
FIG. 6 is a cross-sectional view taken at line 6—6 of FIG. 5.

In FIGS. 5 and 6, the grille assembly 54 of each of first and second light assemblies 14 and 16 are shown in greater detail. As seen in FIG. 5, the grille assembly 24 comprises a plurality of vertically, spaced-apart, parallel members 26. The members 26 are oriented vertically in order to constrain the horizontal diffusion or dispersement of light emitted from the light source. Grille assembly 24 is retained onto the light assembly by grille retainer 20.

The function of grille assembly 24 is better illustrated in FIG. 6. The light assembly, for example, first light assembly 14, includes light source 30 that emits light. The light is directed by light assembly 14 outwards through the red lens 36 and through the grille assembly 24.

The vertical members 26 have a depth 104 and are spaced-apart from each other by a width 106. Each of the members 26, preferably, has a non-reflective surface, and may be constructed with regularly repeated vertical vanes or fins cast upon the inner surfaces of the members 26 so as to further reduce unwanted reflected light.

Grille assembly 24 restricts or constrains light emitting from light assembly 14 within a certain angle of emission. The angle 108 can be referred to as the angle of view of the emitted light. It is well known that the angle of view is defined by the following equation:

$$\text{angle of view} = 2 \times (\text{width}/\text{depth})$$

Therefore, the desired angle of view can be obtained by choosing a suitable aperture width and/or aperture depth for the grille assembly.

Thus, the angles of view for each of the first or second light assemblies 14, 16 can be determined by the construction of the grille assembly 24 used in each of the respective light assemblies.

Alternatives and modifications of the safety device 10 and the method of the present invention are possible. For example, the light assemblies 14, 16 and 18 need not be circular as shown in the preferred embodiment, but may be of any suitable shape such as square, etc. In similar fashion, the physical appearance of device 10 may be any suitable shape but in the preferred embodiment is a smooth aerodynamic shape as shown in the accompanying drawings.

All such modifications and alterations are believed to be within the sphere and scope of the present invention as described and set out in the claims appended herein.

The embodiments of the present invention in which an exclusive property or privilege is claimed are defined as follows:

1. A safety device for mounting on a vehicle and allowing a driver of the vehicle to direct the movement of passengers exiting the vehicle and crossing from a first side of a road to a second side of the road after the vehicle has come to a stop adjacent the first side, comprising:

a) a first light for indicating to the passengers a first position located on the first side of the road, ahead of the vehicle and in sight of the driver and for directing the passengers to move from the first position to a second position located in the road immediately in front of the vehicle and in the sight of the driver, said first light being visible only when the passengers are at the first position and having selectable modes of operation which are an off mode, a steady-on mode and flashing-on mode, said first light operating in one of said steady-on and flashing-on modes of operation to indicate when said passengers are in said first position and operating in the other of said steady-on and flashing-on modes of operation for directing the passengers to said second position, (b) a second light for indicating to the passengers the second position and for directing the passengers to move from the second position to the second side of the road, thereby crossing the road, said second light being visible only when the passengers are at the second position and having selectable modes of operation which are an off-mode, a steady-on mode and a flashing-on mode, said second light operating in one of said steady-on and flashing-on modes of operation to indicate when the passengers are in the second position and operating in the other of the steady-on and flashing-on modes of operation for directing the passengers to said second side of the road.

2. The safety device of claim 1, wherein the first light is in the steady-on mode of operation for indicating the first position, the first light is in the flashing-on mode of operation for directing passengers to the second position, the second light is in the steady-on mode of operation for indicating the second position, and the second light is in the flashing-on mode of operation for directing passengers to the second side.

3. The safety device of claim 2, wherein the vehicle has a door and the first and second lights are each in the off mode of operation when the door is closed, and the first and second lights are each in one of the steady-on or the flashing-on modes of operation when the door is open.

4. The safety device of claim 3, further comprising switch means for allowing the driver to set the operating mode of each of the first and second lights when the door is open.

5. The safety device of claim 4, wherein the switch means allows the driver to set the operating mode of the first and second lights only from the steady-on mode of operation to the flashing-on mode of operation but not vice versa.

6. The safety device of claim 1, further comprising first and second grille assembly means on each of the respective first and second lights for causing the lights to be visible only when passengers are in the first and second positions, respectively.

7. The safety device of claim 6, wherein the first grille assembly means causes the first light to be visible through an angle of about 40°.

8. The safety device of claim 6, wherein the second grille assembly means causes the second light to be visible through an angle of about 33°.

9. A safety device for mounting on a vehicle and allowing a driver of the vehicle to direct the movement of passengers exiting the vehicle and crossing from a first side of a road to a second side of the road after the vehicle has come to a stop adjacent the first side, comprising:

a) a first light visible to the passengers only when the passengers are at a first position located on the first side of the road, ahead of the vehicle and in sight of the driver, said first light having selectable modes of operation which are an off mode, a steady-on mode and a flashing-on mode;

b) a second light visible to the passengers only when the passengers are at a second position located in the road immediately in front of the vehicle and in sight of the driver, said second light having selectable modes of operation which are an off mode, a steady-on mode and a flashing-on mode, c) a third light visible to the passengers only when the passengers are at a position intermediate the vehicle and the first position, said third light having selectable modes of operation which are an off mode and an on mode.

10. The safety device of claim 9, wherein the third light is in a flashing-on mode of operation, the first light is in the steady-on mode of operation for indicating the first position, the first light is in the flashing-on mode of operation for directing passengers to the second position, the second light is in the steady-on mode of operation for indicating the second position, and the second light is in the flashing-on mode of operation for directing passengers to the second side.

11. The safety device of claim 9, wherein the vehicle has a door and the first, second and third lights are each in the off mode when the door is closed; and the third light is in a flashing-on mode of operation and the first and second lights are each in one of the steady-on or flashing-on modes of operation when the door is open.

12. The safety device of claim 11, further comprising switch means for allowing the driver to set the operating mode of each of the first and second lights when the door is open.

13. The safety device of claim 12, wherein the switch means allows the driver to set the operating mode of the first and second lights from the steady-on mode of operation to the flashing-on mode of operations but not vice-versa.

14. The safety device of claim 9, further comprising first and second grille assembly means on each of the respective first and second lights for causing the lights to be visible only when passengers are in the first and second positions, respectively.

15. The safety device of claim 14, wherein the first grille assembly means causes the first light to be visible through an angle of about 40°.

16. The safety device of claim 15, wherein the second grille assembly means causes the second light to be visible through an angle of about 33°.

17. A method of ensuring that passengers exiting from a vehicle can safely cross from a first side of a road to a second side of the road after the vehicle has come to a stop adjacent the first side of the road, comprising the steps of:

a) providing a first visible signal from a first light indicating to the passengers a first position located on the first side of the road, ahead of the vehicle and in sight of a driver of the vehicle, said first light being visible only from said first position;

b) providing a second visible signal from said first light different from said first visible signal therefrom directing the passengers to move from said first position to a second position located in the road immediately in front of the vehicle and in sight of the driver;

c) providing a first visible signal from a second light indicating to the passengers that they have moved to said second position, said second light being visible only when the passengers are at the second position; and d) providing a second visible signal from said second light different from said first visible signal therefrom directing the passengers to move from the second position to the second side of the road, thereby crossing the road.

18. The method of claim 17, wherein both said first and second lights can each be selectively set to one of a plurality of operating modes which are an off mode, a steady-on mode and a flashing-on mode.

19. The method of claim 18, wherein the first visible signal from the first light is the steady-on mode of operation, the passengers are directed to move from the first position to the second position by setting the first light to its flashing-on mode of operation providing said second visible signal from said first light, the first visible signal from the second light is the steady-on mode of operation, and the passengers are then directed to move from the second position to the second side of the road by setting the second light to its flashing-on mode of operation providing said second visible signal from said second light.

20. The method of claim 18, wherein the vehicle has a door and further comprising the steps of setting each of the first and second lights to their off mode of operation when the door is closed, and setting each of the first and second lights to one of their steady-on or flashing-on modes of operation when the door is open.

21. The method of claim 20, wherein the first and second lights can be selectively set from the steady-on mode of operation to the flashing-on mode of operation but not vice-versa.

22. The method of claim 17, further comprising the initial step of directing the passengers to the first position after the passengers have exited the vehicle.

23. The method of claim 22, wherein the passengers are directed to the first position by providing a visible signal from a third light visible by the passengers only when the passengers are at a location intermediate the vehicle and the first position, the first position is indicated by a first light visible to the passengers only when the passengers are at the first position, and the second position is indicated by a second light visible to the passengers only when the passengers are at the second position.

24. The method of claim 23, wherein the third light can be selectively set to one of a plurality of operating modes which are an off mode and a flashing-on mode, and the first and second lights can each be selectively set to one of a plurality of operating modes which are an off mode, a steady-on mode and a flashing-on mode.

25. The method of claim 24, wherein the passengers are directed to move to the first position by setting the third light to its flashing-on mode of operation providing said visible signal therefrom.

26. The method of claim 24, wherein the passengers are directed to move from the first position to the second position by setting the first light to the flashing mode, and the passengers are then directed to move from the second position to the second side of the road by setting the second light to the flashing on mode.

27. The method of claim 24, wherein the vehicle has a door and the method further comprises the steps of setting each of the initial, first and second lights to their off mode when the door is closed, and setting the initial light to the flashing on mode and each of the first and second lights to one of their steady-on or flashing-on modes of operation when the door is open.

28. The method of claim 27, wherein the first and second lights can be selectively set from the steady-on mode of operation to the flashing-on mode of operation but not vice-versa.

\* \* \* \* \*